W. H. LAUDE.
SOD CUTTER.
APPLICATION FILED MAR. 20, 1911.

1,018,064.

Patented Feb. 20, 1912.

WITNESSES:
John G. Schrott
Charles H. Wagner

INVENTOR
Wm. H. Laude

BY
Fred G. Dieterich & Co.
ATTORNEY

UNITED STATES PATENT OFFICE.

WILLIAM H. LAUDE, OF MONTICELLO, IOWA.

SOD-CUTTER.

1,018,064.

Specification of Letters Patent. Patented Feb. 20, 1912.

Application filed March 20, 1911. Serial No. 615,515.

*To all whom it may concern:*

Be it known that I, WILLIAM H. LAUDE, a citizen of the United States, residing at Monticello, in the county of Jones and State of Iowa, have invented a new and Improved Sod-Cutter, of which the following is a specification.

My invention has for its object to provide a simple and inexpensive implement for cutting turf or live sod, that can be conveniently manipulated so as to cut the sod with ease and precision, and which is useful for loosening the cut sod and for handling the cut portion without injuring the structure thereof.

Figure 1:
Figure 2:
Figure 3:
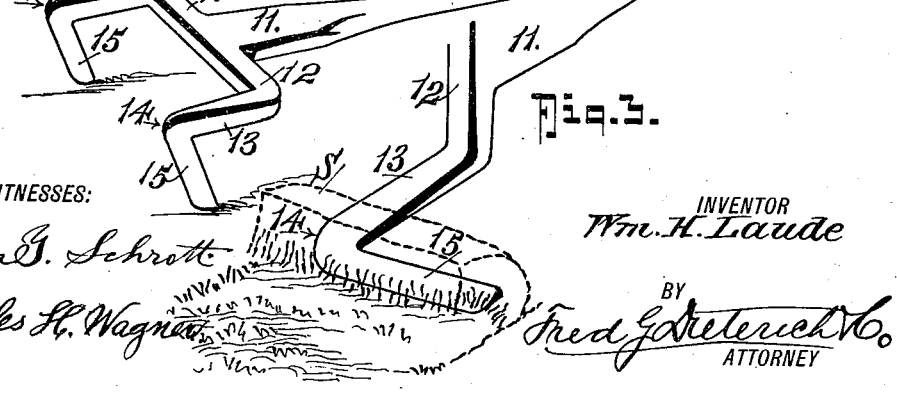

My invention embodies a sod cutting implement constructed in the manner hereinafter described, specifically pointed out in the appended claims and illustrated in the accompanying drawings, in which:

Figure 1, is a view of my improvement and illustrates the practical application thereof. Fig. 2, is a perspective view of the implement. Fig. 3, is a detail view of a portion thereof and illustrates one of the uses for which the implement is adapted.

In its practical construction my sod cutter is formed of a single body comprising a shank 1 of suitable length, one end of which terminates in a hand hold 10 for conveniently gripping the same. The lower end of the shank 1 is flattened as at 11, and merges with the laterally extended arms 12—12 of a ⌐⌐-shaped head, the parallel or pendent members 13—13 of which are gradually tapered to form sharp elbows or rocker bearings 14—14 that merge with the cutting blades 15. The blades 15—15 extend backwardly at an acute angle to the members 13—13 whereby to project upwardly with respect to the said arms, and the said cutter blades 15 in the preferred size of the implement, are ten inches apart and the blades are of a length to cut to a depth of nine inches.

The manner in which my said cutter is used and its advantages will be readily apparent from Fig. 1 of the drawing. In operation the operator forces the elbow ends of the members 14—14 down through the turf a distance to secure a solid rocking bearing for the implement, after which he bears down on the implement and swings it forwardly, see arrow X, and makes the forwardly extended edge cuts of the sod S, it being obvious that by moving the elbow ends of the cutter along the edge cuts thus made the length of the cuts may be continued as desired.

For loosening the cut sod the implement is turned at right angles to that shown in Fig. 1, and one of the cutter blades is entered flatwise under the sod to cut the bottom edge so the sod can be rolled, see Fig. 3, and while I have illustrated it, when the sod has been loosened, as stated, the blade ends can be utilized as a rake to pull and roll over the loosened cut end of the sod.

By reason of the peculiar construction and arrangement of the parts as shown and described, the implement is used somewhat on the order of a common spade, since the user by pressing on the members 12 forces the elbow ends 14 into the ground, which starts the cut and as the blades are now on a slant back toward the user, the cut as the pressure continues and the implement is swung forwardly, see arrow, the cut is continued toward the cuts previously made, as is indicated in Fig. 1.

While I have shown my invention as especially utilized for cutting sod, the same is also useful for tilers who dig drains and lay tiling.

What I claim is:

1. A sod cutter comprising a shank, a pair of arms projecting from said shank in parallel planes, said arms terminating in sharp edged blade members that project forwardly in the planes of the said arms, said arms and blades at their juncture being curved to form bearing elbows.

2. A sod cutter comprising a shank, a pair of arms projected from the said shank in parallel planes, said arms terminating in blade members that project upwardly in the planes of the arms, the shank, the arms and the blade members being an integral body; said arms and blade members at their junctures forming penetrating elbows.

WILLIAM H. LAUDE.

Witnesses:
H. M. CARPENTER,
J. N. PETERSON.

Copies of this patent may be obtained for five cents each, by addressing the "Commissioner of Patents, Washington, D. C."